United States Patent [19]

Middelmann et al.

[11] Patent Number: 5,779,012
[45] Date of Patent: Jul. 14, 1998

[54] HYDROKINETIC TORQUE CONVERTER WITH LOCKUP CLUTCH

[75] Inventors: Volker Middelmann, Bühl; Marc Meisner, Baden-Baden; Jürgen Freitag, Ottersweier, all of Germany

[73] Assignee: Luk Getriebe-Systeme GmbH, Bühl, Germany

[21] Appl. No.: 906,460

[22] Filed: Aug. 5, 1997

Related U.S. Application Data

[63] Continuation of Ser. No. 386,725, Feb. 10, 1995, abandoned.

[30] Foreign Application Priority Data

| Feb. 11, 1994 | [DE] | Germany | 44 04 454.2 |
| Oct. 21, 1994 | [DE] | Germany | 44 37 747.9 |

[51] Int. Cl.$^6$ ............... F16H 45/02; F16H 61/14
[52] U.S. Cl. ............ 192/3.3; 192/3.31; 192/103 FA
[58] Field of Search ............ 192/3.29, 3.3, 192/3.31, 103 FA

[56] References Cited

U.S. PATENT DOCUMENTS

| 3,213,983 | 10/1965 | Smirl. | |
| 3,410,378 | 11/1968 | Maurice | 192/103 FA X |
| 3,489,254 | 1/1970 | Sparrow | 192/103 FA X |
| 3,693,478 | 9/1972 | Malloy | 192/3.3 X |
| 4,152,894 | 5/1979 | Rumyantsev et al. | 192/3.3 X |
| 4,373,617 | 2/1983 | Mathues | 192/3.31 |
| 4,618,041 | 10/1986 | Sotoyama et al. | |
| 4,619,350 | 10/1986 | Maezono et al. | |
| 4,640,395 | 2/1987 | Murasugi et al. | |
| 4,966,261 | 10/1990 | Kohno et al. | 192/3.29 |

FOREIGN PATENT DOCUMENTS

WO 94/04852   3/1994   WIPO.

Primary Examiner—Richard M. Lorence
Attorney, Agent, or Firm—Darby & Darby

[57] ABSTRACT

The housing of a hydrokinetic torque converter in the power train between the engine and the transmission of a motor vehicle contains a lockup valve which can be engaged to transmit torque directly from the output element of the engine to the output member of the turbine in the housing. Engagement of the lockup clutch at a relatively low RPM of the engine and/or under certain other circumstances is prevented or minimized by the provision of one or more valves which are designed to establish or to at least partially seal one or more paths for direct flow of hydraulic fluid between two compartments forming part of a chamber in the housing of the torque converter and being disposed at opposite sides of the axially movable piston of the lockup clutch. The valve or valves can be designed to react in response to changing RPM of the housing of the torque converter, in response to changes of the temperature of hydraulic fluid in the housing and/or in response to changes of the viscosity of such fluid. The valving element or elements of the valve or valves can be caused to change its or their position(s) relative to the respective path(s) in response to the action of centrifugal force and/or due to direct contact with hydraulic fluid in the housing of the torque converter.

22 Claims, 3 Drawing Sheets

HYDROKINETIC TORQUE CONVERTER WITH LOCKUP CLUTCH

CROSS-REFERENCE TO RELATED CASE

This is a Rule 1.62 Continuation of commonly owned copending patent application Ser. No. 08/386,725 filed Feb. 10, 1995, now abandoned.

BACKGROUND OF THE INVENTION

The invention relates to improvements in torque transmitting apparatus in general, and more particularly to improvements in torque transmitting apparatus which employ hydrokinetic torque converters. Still more particularly, the invention relates to improvements in torque transmitting apparatus of the type wherein a hydrokinetic torque converter cooperates with or embodies a lockup clutch, also called bypass clutch.

It is known to utilize a hydrokinetic torque converter in the power train between the engine and the transmission in a motor vehicle. As a rule, the torque converter comprises a housing which defines a fluid-filled chamber and receives torque from the output element of the engine. The housing drives a pump which can transmit torque to the input element of the transmission by way of a turbine in the chamber of the housing. A stator can be interposed between the pump and the turbine as seen in the axial direction of the torque converter. The housing of the torque converter can accommodate a lockup clutch having a piston which is movable in the axial direction of the torque converter in response to the establishment of necessary pressure differential between a first compartment of the chamber at one side and a second compartment of the chamber at the other side of the piston. When the lockup clutch is engaged, it can transmit torque from the housing of the torque converter (i.e., from the output element of the engine) directly to the turbine in the chamber of the housing and hence directly to the input element of the transmission.

Torque transmitting apparatus of the above outlined character are disclosed, for example, in U.S. Pat. No. 4,618,041 (granted Oct. 21, 1986 to Sotoyama et al. for "Lockup control system for a torque converter for an automatic transmission"), in U.S. Pat. No. 4,619,350 (granted Oct. 28, 1986 to Maezono et al. for "Clutch operation control system for fluid torque converter of vehicular transmission") and in U.S. Pat. No. 4,640,395 (granted Feb. 3, 1987 to Murasugi et al. for "Slip control mechanism for friction clutch in torque converter of automatic power transmission"). The disclosures of the above enumerated patents are incorporated herein by reference.

A drawback of heretofore known torque transmitting apparatus employing hydrokinetic torque converters and lockup clutches is that their operation is not entirely satisfactory under certain circumstances when such apparatus are in actual use, e.g., in the power trains between the engines and the transmissions of motor vehicles. For example, it is often desirable or plain necessary to disengage the lockup clutch, at least for a certain interval of time, during certain stages of operation of the motor vehicle. Such situation can develop, for example, when the temperature of surrounding air is relatively low or very low. The reason is that the hydraulic fluid which is utilized to fill the chamber defined by the housing of the torque converter is normally oil and the viscosity of such fluid increases in response to decreasing temperature. The pumping device which is utilized in conventional torque transmitting apparatus of the above outlined character is incapable of conveying the high-viscosity fluid at a required rate so that the pressure of fluid is too low or cannot be maintained at a desired value, namely at a value which is necessary to ensure that the lockup clutch remains disengaged or that the lockup clutch is disengaged to a desired degree. Such disengagement or partial disengagement of the lockup clutch is ensured if the pressure in one of the aforementioned compartments is maintained at or above a certain value. Many torque transmitting apparatus cannot ensure predictable disengagement or partial disengagement of the lockup clutch if the temperature of the surrounding atmosphere is close to or below 0° C.

Additional serious problems can arise when the transmission receiving torque from a standard torque converter is shifted in reverse gear. The reason is that, in many (actually in most) instances, the modulation pressure (namely the pressure which is necessary for proper operation of the gear transmission) increases with simultaneous drop of fluid pressure in the torque converter. This entails undesirable (at least partial) engagement of the lockup clutch. The reason for such at least partial engagement of the lockup clutch under the above outlined circumstances is the development of a force attributable to fluid pressure and arising as an integral effect of variations of fluid pressure at the opposite sides of the piston forming part of the lockup clutch. The variations of fluid pressure at opposite sides of the piston develop primarily as a result of the kinematic and/or dynamic relationships of fluid elements, namely essentially in dependency on their average peripheral speed and hence in dependency on the rotational speed of the parts (such as the housing and the turbine of the torque converter and the piston of the lockup clutch) which flank the aforementioned compartments of the chamber in the housing of the torque converter. Accordingly, the operation of the torque transmitting apparatus is dependent upon the RPM of the pump and turbine of the torque converter and upon the RPM of the piston of the lockup clutch. Reference may be had, for example, to U.S. Pat. No. 3,213,983 (granted October 26, 1965 to Smirl et al. for "Fluid actuated transmission device") which discusses the development and the effects of such forces and pressures. The disclosure of the patent to Smirl et al. is incorporated herein by reference.

An additional drawback of heretofore known torque transmitting apparatus which embody a hydrokinetic torque converter and a lockup clutch is that they are complex and expensive.

OBJECTS OF THE INVENTION

An object of the invention is to provide a torque transmitting apparatus which embodies a hydrokinetic torque converter and a lockup clutch and is constructed and assembled in such a way that its operation is satisfactory (or at least more satisfactory than that of heretofore known apparatus) under all circumstances which arise in actual use of such apparatus.

Another object of the invention is to provide a relatively simple, compact and inexpensive torque transmitting apparatus which can be utilized as a superior substitute for heretofore known apparatus employing a hydrokinetic torque converter and a lockup clutch.

A further object of the invention is to provide a novel and improved power train which employs a torque transmitting apparatus of the above outlined character.

An additional object of the invention is to provide a motor vehicle which embodies the improved torque transmitting apparatus.

Still another object of the invention is to provide a novel and improved lockup clutch which can be utilized in the above outlined torque transmitting apparatus.

A further object of the invention is to provide a novel and improved combination of a lockup clutch or bypass clutch and a hydrokinetic torque converter.

Another object of the invention is to provide a torque transmitting apparatus which can operate in a desired manner irrespective of pronounced variations of a number of different parameters such as the RPM of the housing of the torque converter, the temperature of the fluid in the housing of the torque converter and/or the viscosity of such fluid.

SUMMARY OF THE INVENTION

One feature of the present invention resides in the provision of a torque transmitting apparatus which comprises a hydrokinetic torque converter having a fluid-containing chamber and including a pump rotatable about a predetermined axis at a variable RPM by a rotary output element (e.g., a camshaft or a crankshaft) of a prime mover (such as the combustion engine or another engine of a motor vehicle). The torque converter further comprises a turbine which is disposed in the chamber and includes an output member which is rotatable about the predetermined axis (the output member can constitute the input element of an adjustable transmission in the power train between the engine and one or more wheels of the motor vehicle). Still further, the torque converter can comprise a stator which is disposed in the chamber between the pump and the turbine, as seen in the direction of the predetermined axis. The apparatus further comprises a lockup clutch or bypass clutch which is engageable to transmit torque of variable magnitude from the output element of the prime mover to the output member of the turbine and includes a piston movable in the direction of the predetermined axis and dividing the chamber into first and second compartments respectively containing bodies of fluid (e.g., oil) at first and second pressures. The differential between the first and second pressures determines the magnitude of torque being transmitted by the lockup clutch, and the apparatus further comprises at least one valve which is adjustable to establish at least one path for the flow of fluid between the first and second compartments at a rate varying as a function of at least one of a plurality of parameters including the RPM of the output element of the prime mvoer, the temperature of the fluid in the chamber and the viscosity of fluid in the chamber to thus influence the pressure differential and hence the magnitude of torque being transmitted by the clutch. The at least one valve is operative (1) to permit the flow of fluid between the first and second compartments in response to at least one of (1a) a reduction of the RPM to below a predetermined RPM, (1b) a drop of fluid temperature below a predetermined value and (1c) a rise of the viscosity of fluid above a preselected value, and (2) to at least reduce the rate of fluid flow between the first and second compartments in response to at least one of (2a) a rise of the RPM above the predetermined RPM, (2b) a rise of fluid temperature above the predetermined value and (2c) a drop of the viscosity of fluid below the preselected value.

The at least one valve can constitute a slide valve, a rotary valve, a cock or a butterfly valve.

For example, the at least one valve can comprise at least one valving element which is acted upon and is movable by centrifugal force in response to rotation of the output element of the prime mover to thereby vary the rate of fluid flow between the first and second compartments. Such at least one valve can further comprise means (e.g., one or more prestressed coil springs) for yieldably urging the at least one valving element in a direction to increase the rate of fluid flow between the first and second compartments.

The at least one valving element of the at least one valve can be constructed, mounted and operated to move in response to changes of at least one of the parameters including the temperature and the viscosity of the fluid in the chamber to thereby vary the rate of fluid flow between the first and second compartments. The at least one valving element can include or constitute a bimetallic element, and the at least one valve can constitute a thermostatic valve.

It is also possible to provide the at least one valve with at least one valving element which is designed to vary the rate of fluid flow between the first and second compartments in accordance with a memory effect.

It is equally possible to provide the at least one valve with at least one valving element which is movable in response to changes of at least one of the aforementioned plurality of parameters to thereby vary the rate of fluid flow between the first and second compartments independently of at least one of the first and second pressures. The at least one valve embodying such at least one valving element can include or constitute a slide valve.

The piston of the lockup clutch can be designed to include a radially inner portion having a first diameter and surrounding a central opening of the piston, and a radially outer portion having a second diameter larger than the first diameter. The at least one valve can be installed in such a way that it is nearer to the radially inner portion than to the radially outer portion of the piston.

The lockup clutch can further comprise a torsional vibration damper which operates between the piston and the output member of the turbine. The damper is or can be disposed at a first radial distance from the predetermined axis and the at least one valve is or can be disposed at a lesser or shorter second distance from the predetermined axis.

The torsional vibration damper can comprise one or more energy storing elements (e.g., coil springs acting in the circumferential direction of the turbine) disposed at a first radial distance from the predetermined axis, and the at least one valve is or can be disposed at a lesser second radial distance from such axis.

The piston of the lockup clutch can comprise an annular toothed radially inner portion disposed at a first radial distance from the predetermined axis, and the at least one valve can be installed at a second radial distance from the predetermined axis. The second distance is or can be selected in such a way that it at most matches but can be less than the first distance.

The at least one valve is or can be installed in the improved torque transmitting apparatus in such a way that it is adjacent a radially inner portion of the piston, and such radially inner portion of the piston is or can be spaced apart from the predetermined axis as seen in the radial direction of such axis.

As mentioned above, the prime mover can constitute or include or form part of an engine (e.g., a combustion engine) in a motor vehicle, and the output member can be designed to constitute or include or form part of a rotary input element of an adjustable transmission in the power train between the engine and one or more wheels of the motor vehicle. Such apparatus can further comprise a regulating unit which is designed to operate the torque converter and to adjust the transmission. Still further, such apparatus preferably comprises a source of hydraulic fluid including a pumping device which is controlled by the regulating unit and serves to supply hydraulic fluid to the adjustable transmission as well as to the lockup clutch. The regulating unit can comprise means for maintaining the lockup clutch in a disengaged condition when the temperature of fluid in the chamber of the torque converter is below a given value and for permitting engagement of the lockup clutch when the temperature of hydraulic fluid in the chamber of the torque converter rises above the given value. The at least one valve of such apparatus is preferably operative to establish the at least one path for the flow of fluid between the first and second compartments when the fluid temperature in the chamber is below the given value and to at least reduce the rate of fluid flow between the first and second compartments when the temperature of fluid in the chamber of the torque converter rises above the given value. The at least one valve of such apparatus can include, constitute or form part of a slide valve. The piston of the lockup clutch in such apparatus includes a radially inner portion which is spaced apart from the predetermined axis and the at least one valve can be installed adjacent the radially inner portion of such piston.

If the prime mover is an engine in a motor vehicle and the output member of the turbine constitutes or includes or forms part of the input element of an adjustable transmission, the apparatus preferably further comprises the aforementioned regulating unit which serves to operate the torque converter and to adjust the transmission, and the aforementioned source of hydraulic fluid which includes a pumping device controlled by the regulating unit to supply hydraulic fluid to the transmission and to the lockup clutch. In contrast to the aforementioned regulating unit, the regulating unit of the torque transmitting apparatus can include means for maintaining the lockup clutch in a disengaged condition when the temperature of fluid in the chamber of the torque converter is below a given value and for permitting engagement of the lockup clutch when the temperature of fluid in the chamber of the torque converter rises above the given value; the at least one valve of such apparatus is or can be operative to regulate the fluid flow between the first and second compartments as a function of changes of the temperature of fluid in the chamber of the torque converter. The at least one valve of such torque transmitting apparatus can include, constitute or form part of a slide valve.

The at least one valve of the improved torque transmitting apparatus can comprise at least one valving element which is movable between open and closed positions to thereby respectively permit the fluid to flow between the first and second compartments and to at least substantially prevent the fluid from flowing between the first and second compartments. Such at least one valve can further comprise means for moving the valving element at least from one of the open and closed positions to the other of these positions in stepwise fashion. Alternatively, the moving means of the at least one valve can be designed to gradually move the valving element at least from one of the open and closed positions toward the other of these positions.

The lockup clutch can further comprise at least one torsional vibration damper which operates between the piston of the clutch and the output member of the turbine. The damper can be installed at a first radial distance from the predetermined axis and the at least one valve can be installed at a lesser second radial distance from the predetermined axis. The at least one valving element of the at least one valve forming part of such torque transmitting apparatus can be installed for movement between open and closed positions and the at least one valve can further comprise means for gradually moving the valving element at least from one of the open and closed positions toward the other position in accordance with a predetermined program. Alternatively, the means for moving the at least one valving element from at least one of the open and closed positions toward the other position can be designed to abruptly move the at least one valving element to at least one of the open and closed positions.

As already mentioned hereinbefore, the piston of the lockup clutch can include a toothed radially inner portion disposed at a first radial distance from the predetermined axis and the at least one valve can be installed at a second radial distance from such axis. The second radial distance is preferably selected in such a way that it does not exceed but can be less than the first radial distance. The at least one valving element of the at least one valve in such torque transmitting apparatus is movable between open and at least substantially closed positions and the at least one valve preferably further comprises means for abruptly moving the at least one valving element to at least one of the open and at least partially closed positions.

The at least one valve can be provided with at least one opening (e.g., in the form of an elongated slot) which establishes the at least one path for the flow of hydraulic fluid between the first and second compartments, and such at least one valve can further comprise means for varying the rate of fluid flow through the at least one opening. The means for varying the rate of fluid flow can comprise means for regulating the rate of fluid flow through the at least one opening in accordance with a predetermined pattern.

The torque converter further comprises a housing which defines the aforementioned chamber, and the at least one valve is or can be installed in such housing.

The at least one valve is or can be connected with the piston of the torque converter. For example, the at least one valve can be mounted on the piston.

As already explained hereinbefore, the at least one valve can comprise at least one valving element which is movable between an open position to thus establish a flow of fluid between the first and second compartments in a first direction (e.g., in the direction of the predetermined axis) and a second position in which the at least one valving element at least reduces the rate of fluid flow between the first and second compartments. Such at least one valve can further comprise means for moving the at least one valving element from the second position in a direction at least substantialy at right angles to the first direction. Such means for moving the at least one valving element can include means for imparting to the at least one valving element a composite movement including a movement in the second direction at least during a first stage of movement from the second position and a movement in a third direction during a next-following stage of movement of the at least one valving element from the second position.

The means for moving the at least one valving element at least from one of the open and at least substantially closed positions toward the other position is preferably designed to move the at least one valving element at an angle to the direction of fluid flow between the two compartments in the open position of the at least one valving element. Such angle is or can be between about 30° and about 90°.

The construction of the at least one valve is or can be such that the at least one valving element is movable from at least one of the open and at least substantially closed positions toward the other of these positions in a direction substantially at right angles to the direction of flow of fluid between the first and second compartments in the open position of the at least one valving element, and such movement of the valving element in a direction substantially at right angles to the direction of fluid flow is or can be at least substantially independent of the fluid pressure in at least one of the first and second compartments. The at least one valve comprising such valving element or elements can include, form part or constitute a slide valve. Expressed in a somewhat different way, the at least one valving element is preferably movable from at least one of its positions toward the other position in a direction at an angle greater than 0° to the direction of fluid flow between the first and second compartments in the open position of the at least one valving element.

Another feature of the invention resides in the provision of an apparatus for transmitting torque between a rotary output element (such as a crankshaft or a camshaft) of an engine (e.g., an internal combustion engine) in a motor vehicle and a rotary input element (e.g., a shaft) of an adjustable transmission between the engine and one or more wheels of the vehicle. The apparatus comprises a hydrokinetic torque converter including a pump which is driven by the output element of the engine and a turbine which is or which can be driven by the pump and serves to drive the input element of the transmission. The apparatus further comprises an engageable and disengageable lockup clutch or bypass clutch which is engageable to transmit torque from the output element of the engine to the turbine and/or to the input element of the transmission, a regulating unit which serves to operate the torque converter and to adjust the transmission, and a pumping device which is controlled by the regulating unit and serves to supply a hydraulic fluid (such as oil) to the transmission and to the clutch. The regulating unit includes means for maintaining the clutch in the disengaged condition when the fluid temperature in a chamber of the torque converter is below a given value and for permitting engagement of the clutch when the temperature of fluid in the chamber rises above the given value. Still further, the apparatus comprises at least one valve which is operative to establish and at least substantially seal a path between a first compartment and a second compartment at opposite sides of a mobile piston of the lockup clutch. The at least one valve includes at least one valving element which serves to establish the path for the flow of fluid between the first and second compartments when the fluid temperature in the chamber is below a given value and to at least reduce the rate of fluid flow between the first and second compartments when the temperature of fluid in the chamber rises above the given value. The at least one valve can be installed adjacent a radially inner portion of the piston forming part of the lockup clutch.

The novel features which are considered as characteristic of the invention are set forth in particular in the appended claims. The improved torque transmitting apparatus itself, however, both as to its construction and its mode of operation, together with additional features and advantages thereof, will be best understood upon perusal of the following detailed description of certain presently preferred specific embodiments with reference to the accompanying drawings.

DESCRIPTION OF PREFERRED EMBODIMENTS

Figure 1:
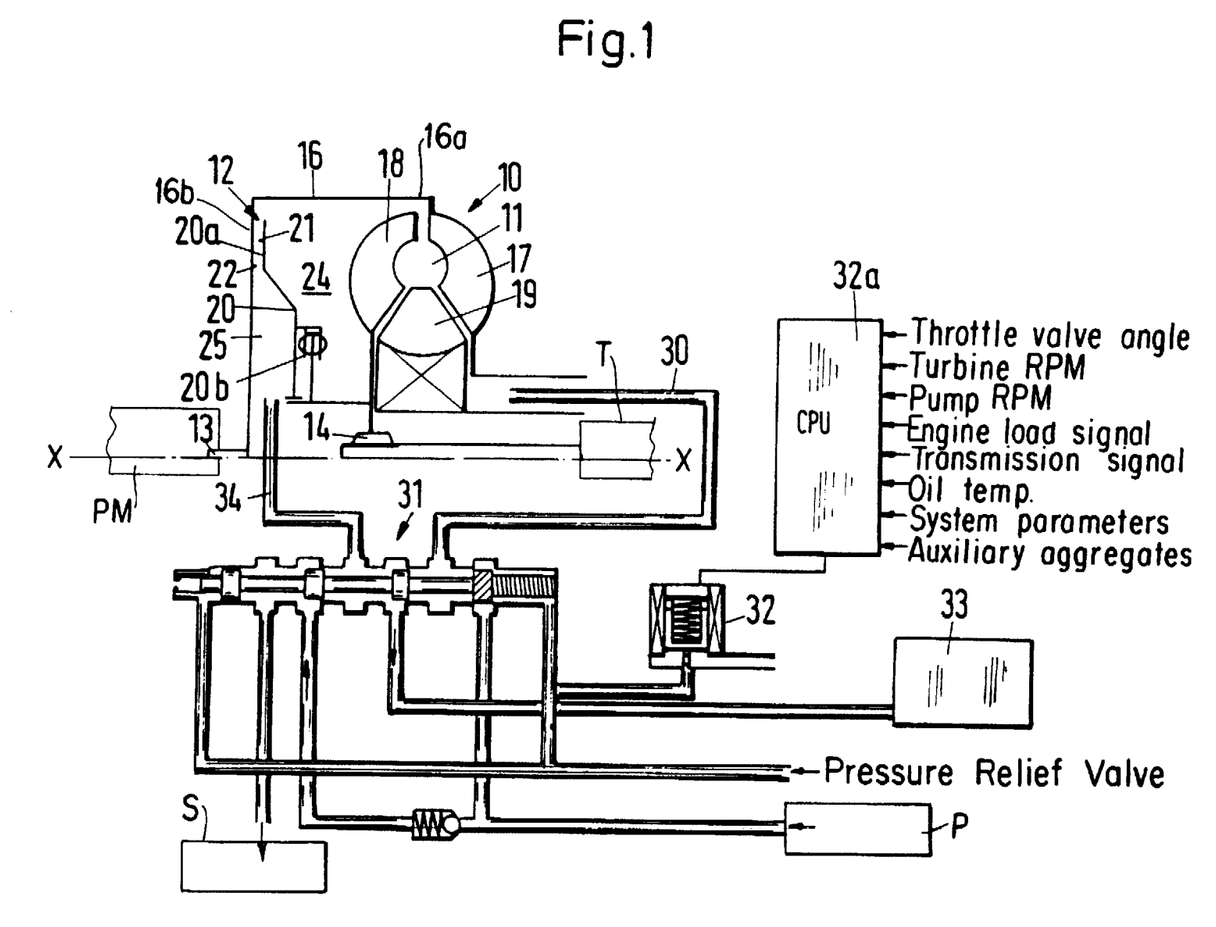
FIG. 1 is a fragmentary partly axial sectional and partly schematic elevational view of a torque transmitting apparatus which embodies one form of the present invention.

The torque transmitting apparatus 10 of FIG. 1 comprises a hydrokinetic torque converter 11 and a lockup clutch or bypass clutch 12 which can be engaged or disengaged in response to changes of the pressure differential between two bodies of a hydraulic fluid (such as oil) at opposite sides of its piston 20a. The lockup clutch 12 is installed to operate in parallel with the torque converter 11.

The housing 16 of the torque converter 11 can receive torque from the rotary output element 13 of a prime mover PM. The latter can constitute a combustion engine or another engine and the output element 13 can constitute the crankshaft or the camshaft of such engine. When the prime mover PM is on, its output element 13 rotates about an axis X—X which is common to the torque converter 11 and the lockup clutch 12.

The torque converter 11 further comprises a pump 17 which is or can be of one piece with the housing 16 and comprises a set of vanes or blades extending into an internal chamber 16a of the housing 16. The chamber 16a further accommodates a rotary turbine 18 which can transmit torque to a rotary output member 14. In the embodiment of FIG. 1, the output member 14 is a shaft which constitutes the input element of an adjustable transmission T, e.g., a transmission which can drive one or more wheels of a motor vehicle. The transmission T can constitute an automatically adjustable transmission of the character used in power trains of motor vehicles to drive one or more wheels of the vehicle at any one of a plurality of forward speeds and in reverse. The illustrated torque converter further comprises a stator 19 which is installed in the chamber 16a between the pump 17 and the turbine 18, as seen in the direction of the axis X—X.

The lockup clutch 12 is installed in the chamber 16a between the turbine 18 and the left-hand wall 16b of the housing 16, namely that wall which receives torque (either directly or indirectly) from the output element 13 of the prime mover PM. When the clutch 12 is engaged, it can transmit torque directly from the housing 16 to the turbine 18 and/or to the output member 14 of the torque converter 11. In order to transmit torque from the wall 16b to the output member 14, the friction lining 21 at the left-hand side of the radially outer portion of the piston 20a must engage a confronting friction face or friction lining 22 at the inner side of the wall 16b. Such engagement involves axial movement of the piston 20a in a direction from the turbine 18 toward the prime mover PM, i.e., toward the wall 16b.

The piston 20a divides the chamber 16a of the housing 16 into a first compartment 24 and a second compartment 25. When the pressure of the body of fluid in the compartment 24 exceeds the pressure of the body of fluid in the compartment 25, the piston 20a moves axially to engage its friction lining 21 with the friction face 22 of the wall 16b. It is clear that the wall 16b can be provided with a second friction lining which cooperates with the friction lining 21 when the lockup clutch is engaged or that only the wall 16b carries a friction lining which is engaged by a friction face on the radially outer portion of the piston 20a when the clutch 12 is engaged.

The radially inner portion 20 of the piston 20a can transmit torque to the turbine 18 and/or to the output member 14 by way of a torsional vibration damper 20b.

The compartment 24 of the chamber 16a can receive pressurized fluid from a source S of hydraulic fluid, e.g., a source including a pumping device P. At such time, the pumping device P supplies pressurized fluid into a conduit 30 which discharges into the compartment 24 of the chamber 16a in the housing 16. The means for controlling the flow of hydraulic fluid into the compartment 24 via conduit 30 and from the compartment 25 through a second conduit 34 includes a slide valve 31. The operation of the valve 31 is regulated by a unit 32 which receives signals from a computer or processor 32a. For example, the valve 31 can include or constitute a proportioning or metering valve or a pulse width modulated valve. The processor 32a causes the unit 32 to regulate the operation of the valve 31 in response to variation of one or more parameters and/or as a function of information which is stored in the memory of the computer 32a.

The fluid which is evacuated from the compartment 25 through the conduit 34 can flow back to the source and preferably passes through a heat exchanger or any other suitable cooler 33 prior to being reintroduced into the compartment 24. The reintroduced fluid acts upon the turbine 18 at the output side of the pump 17 as well as upon the piston 20a of the lockup clutch 12.

The clutch 12 is preferably designed to operate with with slip, i.e., to permit certain angular movements of the piston 20a and the wall 16b relative to each other in the engaged condition of the clutch. Such slip is desirable and advantageous when the lockup clutch 12 is engaged during certain stages of operation of the vehicle which embodies the torque transmitting apparatus 10. The extent of slip is regulatable by the valve 31 which can establish a desired pressure differential between the bodies of hydraulic fluid in the compartments 24 and 25 of the chamber 16a. In other words, the magnitude of torque which is being transmitted by the lockup clutch 12 is regulatable by the valve 31 which determines the difference between the pressure of fluid in the compartment 24 and the pressure of fluid in the compartment 25.

The torque which the prime mover PM transmits to the output member 14 (i.e., to the input element of the transmission T) is the sum of torques being transmitted by the torque converter 11 and the lockup clutch. In other words, the transmitted prime mover torque $M_{PM}$ equals the sum of torques $M_{12}$ and $M_{17}$. If the losses attributable to the power train are disregarded, the torque $M_T$ which is being transmitted by the transmission equals the sum of torques $M_{12}$ and $M_{17}$ or the sum of torque $M_{12}$ plus the torque $M_{17}$ times a conversion factor. The ratio of torque which is being transmitted by the torque converter 11 increases in response to a reduction of torque which is being transmitted by the lockup clutch 12 and vice versa.

The exact manner in which the unit 32 and the processor 32a regulate the operation of the valve 31 (i.e., of the torque converter 11 and clutch 12) is or can be similar to that fully described in the German patent application Serial No. P 43 22 974 (corresponding to U.S. patent application Ser. No. 08/649,065 filed May 16, 1996, which is a continuation of Ser. No. 08/272,920 filed Jul. 8, 1994, now abandoned) or in the PCT patent application Ser. No. 93/00765 (corresponding to allowed U.S. patent application Ser. No. 08/211,978 filed Oct. 17, 1994).

Figure 2:
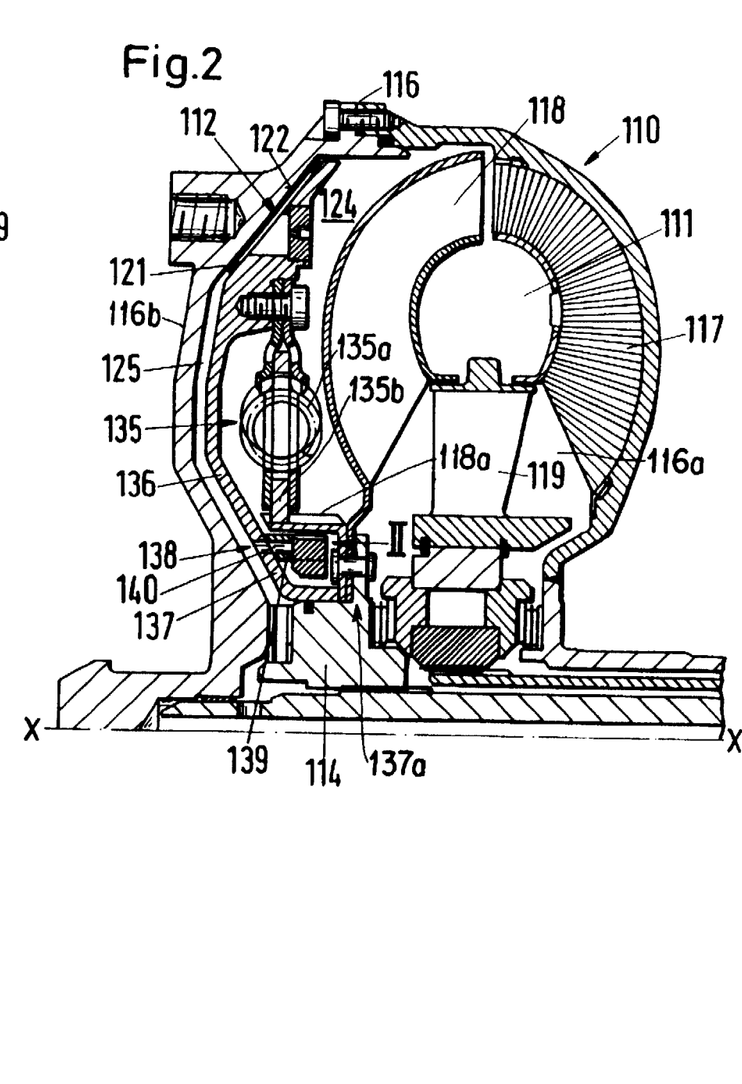
FIG. 2 is a fragmentary axial sectional view of the hydrokinetic torque converter and lockup clutch in a modified torque transmitting apparatus.

The torque transmitting apparatus 110 of FIG. 2 comprises a hydrodynamic torque converter 111 and a lockup clutch 112. The piston 136 of the clutch 112 can transmit torque directly to the output member 114 of the apparatus 110 by way of a damper 135. The latter can be said to constitute a means for transmitting torque between the clutch 112 and the torque converter 111.

The torque converter 111 comprises a rotary housing 116 which can receive torque directly from the output element of a prime mover, such as the output element 13 of the prime mover PM shown in FIG. 1. One part of the housing 116 constitutes the shell of a pump 117 having a set of vanes or blades extending into the chamber 116a of the housing. The chamber 116a further accommodates a turbine 118 and a stator 119 which latter is installed between the pump 117 and the turbine, as seen in the direction of the common axis X—X of the torque converter 111 and lockup clutch 112. The turbine 118 can transmit torque to the output member 114 which latter can constitute, or transmit torque to, the input element of an automatically adjustable transmission corresponding to the transmission T shown in FIG. 1.

The piston 136 of the lockup clutch 112 is installed between the left-hand wall 116b of the housing 116 and the turbine 118 and divides the chamber 116a into a first compartment 124 for the turbine, the pump 117 and the stator 119, and a second compartment 125 between the piston and the wall 116b. The radially inner portion 137 of the annular piston 136 defines a central opening 137a for the output member 114. The radially outer portion of the piston 136 resembles or constitutes a hollow conical frustum and carries a friction lining 121 which bears against an adjacent friction face 122 of the wall 116b when the lockup clutch 112 is at least partially engaged. Such engagement of the clutch 112 takes place in response to a rise of fluid pressure in the compartment 124 above the pressure of the body of fluid in the compartment 125. As already mentioned in connection with the description of FIG. 1, the friction lining 121 can be provided on the wall 116b and the piston 136 is then provided with a friction face complementary to the adjacent surface of the friction lining on the wall 116b, or the lockup clutch 112 can comprise two friction linings, one on the radially outer portion of the piston 136 and the other on the adjacent portion of the inner side of the wall 116b.

The magnitude of torque (M) which the lockup clutch 112 can transmit from the wall 116b of the housing 116 to the output member 114 depends upon the extent of differential which the regulating unit (not shown in FIG. 2) establishes between the pressures of fluid bodies in the compartments 124 and 125, i.e., upon the magnitude of the axial force which the piston 136 is caused to apply to the wall 116b.

Figure 2A:
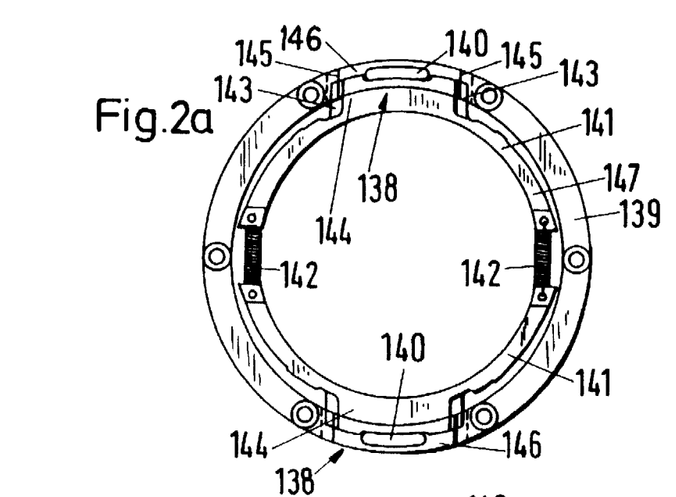
FIG. 2a is a fragmentary elevational view as seen in the direction of arrow II in FIG. 2 and shows two valves of the modified apparatus in open positions.

In accordance with a feature of the apparatus 110 of FIG. 2, the pressure differential between the bodies of hydraulic fluid in the compartments 124 and 125 can be varied by at least one valve which is adjacent the radially inner portion 137 of the piston 136. The apparatus 110 of FIG. 2 actually comprises two valves 138 which are disposed diametrically opposite each other (see FIGS. 2a and 2b). That valve 138 which is shown in FIG. 2 is closed, the same as the two valves 138 shown in FIG. 2b. FIG. 2a shows the two valves in open positions in which streams of hydraulic fluid can flow between the compartments 124, 125 by way of two arcuate circumferentially extending openings 140.

Figure 2B:
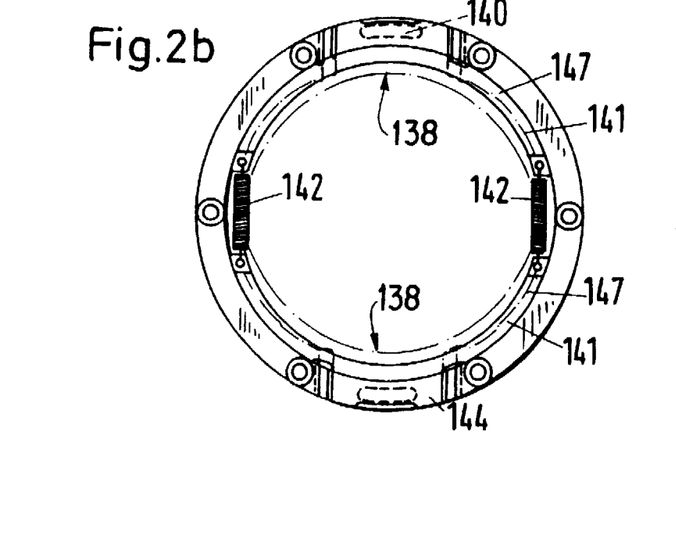
FIG. 2b shows the structure of FIG. 2a but with the valves in closed positions.

Each of the valves 138 comprises a valving element 141 which is held in a radially inwardly retracted position (FIG. 2a) by yieldable biasing means here shown as coil springs 142. The valving elements 141 tend to move radially outwardly under the action of centrifugal force and their tendency to move radially outwardly toward the positions shown in FIG. 2b increases in response to increasing RPM of the input element of the apparatus 110, i.e., in response to increasing RPM of the housing 116 and the valves 138. Each of these valves can be said to constitute a circulating or planetary valve because it is caused to orbit about the axis X—X or to constitute a slide valve because its valving element 141 is slidable radially of the axis X—X toward the open position (FIG. 2a) or toward the closed position (FIGS. 2 and 2b).

The valves 138 comprise a common washer-like body 139 which is carried by (e.g., welded or otherwise connected to) the piston 136 and is provided with the aforementioned arcuate openings 140. Each such opening is in register with a similar opening in the adjacent portion of the piston 136. The openings in the piston 136 can be larger than the openings 140 of the valve body 139, as long as the two openings 140 can permit the flow of hydraulic fluid between the compartments 124, 125 at a maximum rate necessary to ensure the establishment of a required pressure differential at opposite sides of the piston 136. For example, the dimensions of the openings 140 can be selected in such a way that, when the flow of fluid therethrough is not obstructed by the respective valving elements 141, the pressure of fluid in the compartment 124 matches that of the fluid in the compartment 125.

The valving elements 141 of the valves 138 are arcuate portions of washer-like bodies and each such valving element extends along an arc of close to 180° (as seen in the circumferential direction of the valve body 139). Each of the coil springs 142 is coupled to the adjacent end portions of the arcuate valving elements 141, and the bias of such springs suffices to ensure that the openings 140 are exposed when the springs 142 are free to maintain the two valving elements in the end positions shown in FIG. 2a. The valving elements 141 can assume the radially inner end positions of FIG. 2a when the RPM of the housing 116 (and hence of the valves 138) is below a predetermined RPM. Such RPM is determined by the masses of the valving elements 141, the selected initial stressing of the springs 142 or the gradient of such springs. It is presently preferred to select the predetermined RPM in such a way that the valves 138 are open when the RPM of the output element of the prime mover is below the idling speed of such prime mover (it is assumed here that the torque transmitting apparatus 110 of FIG. 2 is installed in the power train between the engine and the transmission of a motor vehicle). For example, the predetermined RPM can be in the range between about 700 and about 1000 revolutions per minute. However, the upper limit of such range can be higher or less and the lower limit can also be higher or less, depending upon the type of the motor vehicle, its intended use and/or certain other parameters.

Each valving element 141 comprises a centrally located radially outwardly extending projection or tongue 144 which can expose or overlie the respective opening 140, depending upon whether the coil springs 142 are capable of maintaining the valving elements 141 in the retracted positions shown in FIG. 2a. Each tongue 144 has two radially extending lateral portions 143 slidable along surfaces 145 flanking radially extending recesses 146 provided in the valve body 139. In addition, the surfaces 145 ensure that the valving elements 141 are compelled to rotate with the body 139, i.e., with the piston 136. Each arcuate opening 140 communicates with one of the recesses 146.

When the aforementioned RPM of the housing 116 is exceeded, the valving elements 141 start to move radially outwardly in their respective recesses 146 and against the opposition of the coil springs 142. As the centrifugal force acting upon the valving elements 141 of the orbiting valves 138 increases, the elements 141 continue to move radially outwardly and come to a halt in the radially outer end positions of FIG. 2b in which their projections 144 overlie and at least substantially seal the respective openings 140. The arcuate portions 147 of the valving elements 141 then abut the adjacent portions of the inner peripheral surface of the valve body 139 and are thus held against further radially outward movement under the action of centrifugal force. Thus, the valve body 139 serves a number of purposes including supporting the valving elements 141, rotating the valving elements, establishing radially extending paths for the projections 144 of the valving elements and limiting the extent of radially outwardly directed movements of the valving elements. The valving elements 141 return toward and to the radially inner end positions of FIG. 2a under the bias of the stressed coil springs 142 in response to a reduction of the RPM of the valve body 139 which rotates with the piston 136.

FIG. 2a shows that the openings 140 in the valve body 139 are relatively large. It is preferred to select the cross-sectional areas of the openings 140 in such a way that the lockup clutch 112 cannot be engaged when the valves 138 are fully open because the fully exposed openings 140 then prevent the establishment of such pressure differential between the bodies of fluid in the compartments 124, 125 which is necessary to ensure that the piston 136 moves its friction lining 121 into frictional contact with the face 122 of the wall 116b.

Though the openings 140 permit an exchange of heat between the bodies of hydraulic fluid in the compartments 124 and 125 when the valves 138 are at least partially open, and though the openings 140 can also perform or contribute to the desirable function of ensuring smooth engagement of the clutch 112, their presently preferred primary purpose is to ensure that the lockup clutch 112 is at least substantially disengaged when the engagement of such clutch is undesirable, for example, when the turbine 118 and the piston 136 are decelerated to a relatively low RPM. Thus, when the RPM of the piston 136 is below the aforementioned predetermined RPM, the action of centrifugal force upon the valving elements 141 decreases and the coil springs 142 are free to retract the valving elements toward their radially inner positions of FIG. 2a. At any rate, it is desirable to ensure that the openings 140 are at least partially exposed when the RPM decreases below the predetermined value so that the lockup clutch 112 is disengaged, either fully or to a desired extent. At such time, the openings 140 permit the flow of fluid between the compartments 124, 125 so that the pressure differential cannot reach a value at which the pressure in the compartment 124 suffices to ensure an engagement of the clutch 112. The pressure in the compartment 125 need not exactly match pressure in the compartment 124, as long as the still existing differential between such pressures cannot entail undesired engagement of the lockup clutch 112 when such engagement is not desirable under certain circumstances, e.g., when the engine of a motor vehicle embodying the torque transmitting apparatus 110 of FIG. 2 is idling. It is desirable to select the operation of the valves 138 in such a way that the pressure in one of the compartments 124, 125 at least tends to vary in a direction to match or approximate the pressure in the other compartment so that the pressure in the compartment 124 cannot cause the piston 136 to move its lining 121 into engagement with the friction face 122 of the wall 116b of the housing 116.

The manner in which the friction face 122 of the wall 116b and the friction lining 121 of the piston 136 are or can be cooled by one or more streamlets of hydraulic fluid between the compartments 124, 125 in the partially or fully engaged condition of the lockup clutch 112 is or can be the same as disclosed in the commonly owned copending patent application Ser. No. 08/375,917 filed Jan. 20, 1995 by Ernst Walth and Georg Weidner for "Friction element for use in clutches". The disclosure of this copending patent application is incorporated herein by reference. Reference may also be had to U.S. patent applications Ser. Nos. 08/211,978 filed Oct. 17, 1994, 08/281,409 filed Jul. 27, 1994 (now U.S. Pat. No. 5,501,309) and 8,375,913 filed Jan. 20, 1995.

Figures 3, 3A:
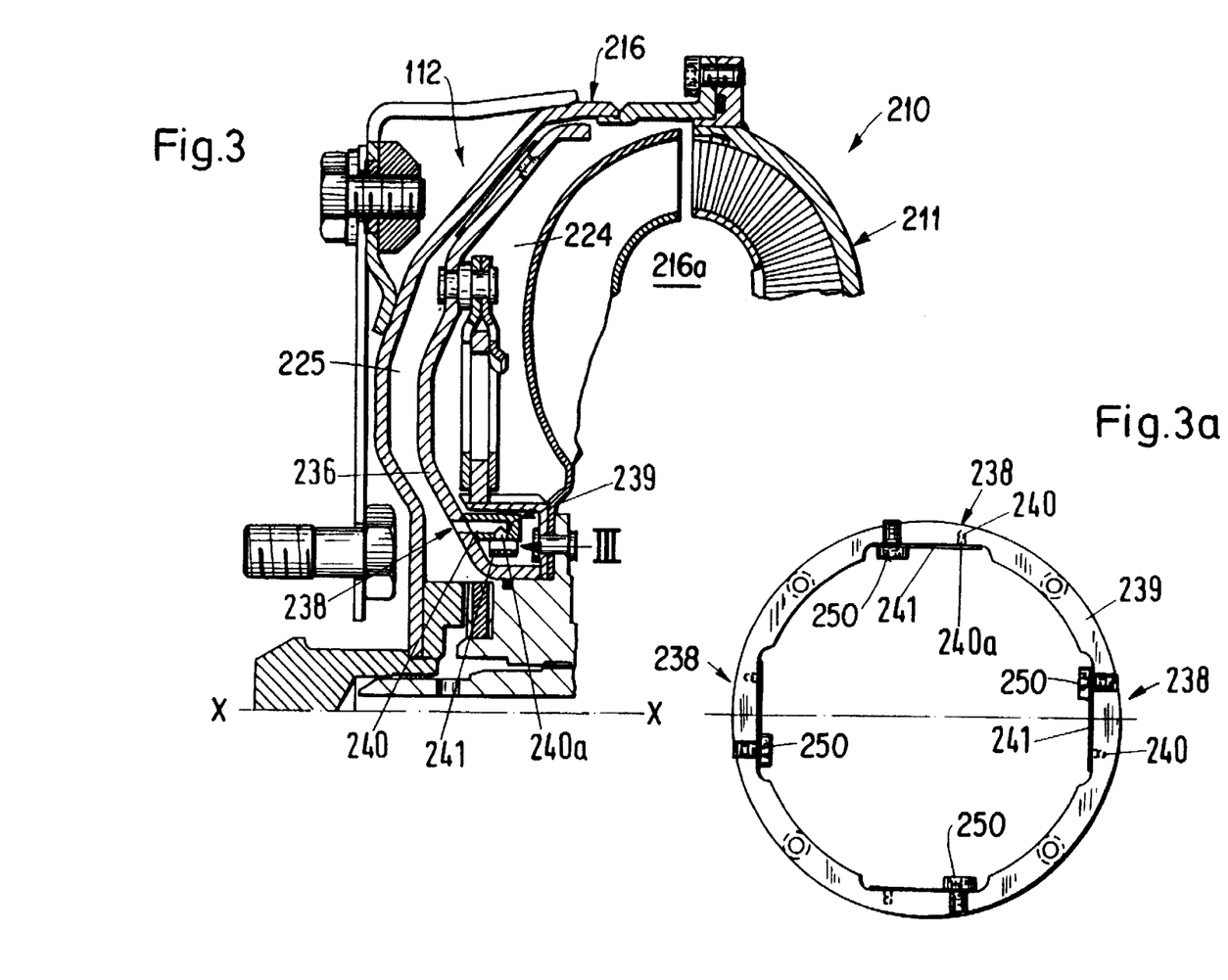
FIG. 3 is a fragmentary axial sectional view of the hydrokinetic torque converter and lockup clutch in a third torque transmitting apparatus.
FIG. 3a is a view as seen in the direction of arrow III in FIG. 3a and shows the valves of the lockup clutch in closed positions.

FIGS. 3 and 3a illustrate a portion of a third torque transmitting apparatus 210. All such parts of the apparatus 210 which are identical with or similar or clearly analogous to the corresponding parts of the apparatus 110 of FIGS. 2 to 2b are denoted by similar reference characters plus 100. The valves 238 of the torque transmitting apparatus 210 comprise a common annular valve body 239 which is affixed to the radially inner portion of the piston 236 forming part of the lockup clutch 212. The openings 240 in the valve body 239 are bores or holes which extend through the member 239 and register with similar holes or bores in the piston 236. The openings 240 and the registering openings of the piston 236 extend in parallelism with the axis X—X. Each opening 240 communicates with a bore or hole 240a which extends radially inwardly to the inner peripheral surface of the valve body 239. FIG. 3a shows that the torque transmitting apparatus 210 comprises four equidistant valves 238 which are spaced apart from each other in the circumferential direction of the valve body 239. The number of valves 238 (as well as of the valves 138) can be increased or reduced without departing from the spirit of the invention.

Each valve 238 comprises a valving element 241 which is designed to alter the rate of fluid flow through the respective composite opening 240, 240a in dependency upon variations of temperature (and hence also in response to variations of the viscosity) of hydraulic fluid in the chamber 216a of the housing 216 forming part of the torque converter 211. The valving elements 241 are bimetallic elements; however, it is equally possible to employ bistable springs in lieu of the bimetallic elements 241. The valving element 241 which is shown in FIG. 3 is maintained in the (at least partially) open position, and the valving elements 241 shown in FIG. 3a are maintained in closed positions.

The valving elements 241 are or can be designed in such a way that they permit at least some flow of hydraulic fluid between the compartments 224, 225 (by way of the respective composite openings 240, 240a) when the temperature of fluid (such as oil) in the chamber 216a drops below a predetermined value, e.g., below 30° C. Otherwise stated, the valving elements 241 can prevent engagement of the lockup clutch 212 when the temperature of the hydraulic fluid is below a predetermined value and the viscosity of such fluid is above a preselected value.

Valves (such as 238) which open or close in response to variations of the temperature of a fluid medium can be utilized with particular advantage in torque transmitting apparatus (such as 210) wherein one and the same pumping device (such as the pumping device P shown in FIG. 1) is designed to supply pressurized hydraulic fluid to the clutches of an automatic transmission (such as the transmission T shown in FIG. 1) as well as to the torque converter (211). The regulating unit (corresponding to the regulating unit 32 of FIG. 1) is preferably designed in such a way that it can control the flow of fluid from the common pumping device to the transmission as well as to the housing of the torque converter. The valves 238 can be said to form part of the regulating unit for the torque converter 211 in that they ensure that the lockup clutch 212 remains disengaged when the temperature of the hydraulic fluid is below a preselected value but permit engagement of the clutch when the temperature of the fluid rises above the preselected value.

The features of the embodiments shown in FIGS. 1 to 3b can be combined and/or interchanged without departing from the spirit of the invention. Thus, the apparatus can be equipped with at least one valve which is responsive to variations of the RPM of the housing of the torque converter and with at least one valve which is responsive to changes of temperature and/or viscosity of the fluid in the chamber 16a, 116a or 216a. All that counts is to ensure that the improved torque transmitting apparatus comprise one or more valves which are adjustable to establish at least one path for the flow of hydraulic fluid between the compartments 24, 25 or 124, 125 or 224, 225 at a rate which varies as a function of at least one of a plurality of parameters including the RPM of the output element of the prime mover, the temperature of hydraulic fluid in the chamber of the torque converter housing, and/or the viscosity of fluid in such chamber to thus influence the pressure differential between the bodies of fluid in the two compartments and hence the magnitude of the torque which can be transmitted by the lockup clutch. The valve or valves are designed to permit the flow of fluid between the two compartments in response to a reduction of the RPM of the output element of the prime mover below a predetermined RPM, a drop of fluid temperature below a predetermined value and/or a rise of the viscosity of fluid above a preselected value. Moreover, the valve or valves should at least reduce the rate of fluid flow between the two compartments in response to a rise of the RPM of the output element of the prime mover above the predetermined RPM (e.g., above the idling RPM of an engine in a motor vehicle), a rise of fluid temperature above the predetermined value and/or a drop of the viscosity of the fluid below the preselected value.

The selected valve or valves can include one or more slide valves, rotary valves, cocks, butterfly (flap) valves, thermostatic valves, valves employing valving elements arranged to vary the rate of fluid flow between the two compartments in accordance with a memory effect and/or others.

Since the rate of delivery of hydraulic fluid into the housing of a torque converter depends to a large extent upon the temperature, and hence upon the viscosity, of the fluid, a conventional torque transmitting apparatus which does not embody one or more valves of the type utilized in the apparatus of the present invention is likely to cause or permit its lockup clutch to become at least partly engaged under circumstances when the engagement (or even partial engagement) of the lockup clutch is highly undesirable. Such circumstances can develop when the torque transmitting apparatus is installed in the power train between the engine and the wheels of a motor vehicle and the RPM of the output element of the engine is below or does not exceed the idling RPM (normally between 700 and 1000 revolutions per minute). Such undesirable full or partial engagement of the lockup clutch in a conventional torque transmitting apparatus is particularly likely to develop when the transmission is shifted into the first forward gear or when the transmission is shifted into reverse gear. The reason for such undesirable partial or full engagement of the lockup clutch in a conventional apparatus is that, when the transmission is being shifted into the first forward gear or into reverse gear, the vehicle is normally at a standstill and the RPM of the rotary components of the torque converter, and hence the RPM of the piston forming part of the lockup clutch, is relatively low. Therefore, the magnitude of dynamic forces acting upon the fluid entering the annular compartment between the piston and the turbine is reduced accordingly. This, in turn, gives rise to the establishment of a more pronounced difference of pressure levels in such compartment as seen in the radial direction of the lockup clutch. The reason is that, as the magnitude of dynamic forces (such as centrifugal force) decreases in response to a reduction of the RPM of the output element of the engine (e.g., to or below the idling speed), the level of the progress of pressures increases radially inwardly in response to the decreasing RPM. Under extreme circumstances, such as when the turbine of the torque converter is at a standstill, the pressure of fluid in the radially inner portion of the compartment between the turbine and the piston of the lockup clutch can match the pressure in the radially outermost portion of such compartment. Otherwise stated, the fluid pressure in such compartment is the same all the way from the radially innermost to the radially outermost portion of the piston.

In accordance with the invention, the aforediscussed valve or valves ensure that the lockup clutch forming part of the improved torque transmitting apparatus remains disengaged when the engamenet of such clutch is not desirable. This is accomplished by the establishment of one or more paths for the flow of fluid between the compartments at the opposite sides of the piston of the lockup clutch, i.e., by the establishment of a pressure differential which is zero or close to zero and ensures that the lockup clutch is disengaged or that the clutch is only partially engaged so that it is incapable of transmitting a pronounced torque directly from the housing directly to the output member of the torque converter. It is presently preferred (at least in most instances) to select the path or paths for the flow of fluid between the two compartments in such a way that the friction lining or friction face of the piston of the lockup clutch is out of contact with the friction face or friction lining on the housing of the torque converter when the transmission of torque by way of the lockup clutch is undesirable, e.g., at the idling RPM of the output element of an engine in a motor vehicle.

In conventional torque transmitting apparatus, engagement of the lockup clutch under circumstances when such engagement is undesirable is attributable to the fact that the so-called "external or outer pressure differential" (namely that between the pressure generated by the pumping device to disengage the lockup clutch and the torque converter reflux pressure) is permitted to decrease. Otherwise stated, conventional torque transmitting apparatus permit an undesirable reduction of the average pressure differential which develops as a result of flow conditions at opposite sides of the piston of the lockup clutch.

As shown in FIGS. 2 and 3, the valve or valves which control the flow of fluid between the compartments 124, 125 or 224, 225 can be installed at the radially inner portion of the respective piston 136 or 236. However, it is equally within the purview of the invention to install the valve or valves radially outwardly of the radially inner portion of the piston. In fact, equalization or substantial equalization of pressure at both sides of the piston can be influenced (modulated) by appropriate selection of the distance of the valve or valves from the axis of the lockup clutch. It is normally desirable to select the location(s) of one or more valves in such a way that the distance between the valve or valves and the axis of the lockup clutch does not appreciably exceed the radial distance of such axis from the radially inner portion of the piston. With reference to FIG. 2, the valves 138 are closer to the radially inner portion 137 than to the radially outer portion (friction lining 121) of the piston 136. The valving elements 141 of the valves 138 shown in FIGS. 2 to 2b can be biased radially inwardly (i.e., to open the respective valves) by means other than the illustrated coil springs, e.g., by one or more single-stage or multistage energy storing elements including leaf springs and/or others.

The valve or valves (such as the valves 138 shown in FIGS. 2 to 2b) are or can be installed radially inwardly of the torsional vibration damper 135. The latter includes one or more energy storing elements 135a in the form of coil springs which act in the circumferential direction of the piston 136. The energy storing elements 135a are preferably disposed radially outwardly of the valves 138.

The piston or the damper of the lockup clutch can be provided with an annulus of internal teeth which are adjacent to or are located radially outwardly of the valve or valves. FIG. 2 shows that the output member 135b of the damper 135 has internal teeth mating with external teeth of a gear 118a affixed to the turbine 118, and such teeth are located radially outwardly of the valves 138. It is possible to install the gear 118a nearer to the axis X—X of the lockup clutch 112, e.g., close to the valves 138.

The valve or valves can be designed to gradually close the respective openings. For example, the valving elements 141 of the valves 138 shown in FIGS. 2 to 2b are or can be designed to gradually close the respective openings 140 as the magnitude of centrifugal force increases, i.e., the springs 142 are caused to yield gradually to thus ensure a gradual radially outward movement of the valving elements 141 in response to increasing RPM of the housing 116. The valving elements 241 also ensure gradual closing of the respective valves 238. However, it is also possible to construct, assemble and mount the valves 138 or 238 or other valves in such a way that they permit abrupt movements of their valving elements from the closed positions toward the open positions and/or vice versa. For example, the valves 238 of FIGS. 3 and 3a can employ bimetallic valving elements 241 or valving elements which vary the rate of fluid flow between the compartments 224 and 225 in accordance with a memory effect. Still further, it is possible to employ valves with bistable valving elements, namely valving elements which can gradually move to at least one of two end positions in response to changes of fluid temperature in the housing of the torque converter. Analogous bistable valving elements can be used to abruptly assume their open and/or closed positions in response to changes of fluid temperature in the chamber of the housing of the torque converter. Still further, it is possible to employ valves with valving elements which can vary the rate of fluid flow through the respective openings in accordance with a predetermined pattern, e.g., stepwise, gradually or abruptly. Abrupt, stepwise or otherwise staggered, or gradual movement of the valving element or elements can take place during or for the purposes of closing or opening the respective valve or valves.

It is often desirable and advantageous that the movements of the valving element or elements from open to closed position(s) and/or vice versa take place independently of the pressures prevailing in the adjacent compartments. For example, the springs 142 shown in FIGS. 2a and 2b can be designed and installed to move the valving elements 141 at right angles to the direction of fluid flow through the respective openings 140 irrespective of the pressure differential between the bodies of fluid in the compartments 124 and 125. It is also possible to equip the improved torque transmitting apparatus with one or more valves which can move the respective valve element or elements at least substantially independently of the fluid pressures in the adjoining compartments, and with one or more valves having valving elements whose movements are or can be influenced by the pressures of fluid bodies in the neighboring compartments. It is often preferred to select valves with valving elements (in the form of flaps, tongues, spools, leaves and/or others) whose movements between open and closed positions are not affected at all or are not appreciably or overly affected by the fluid pressures in the adjacent compartments.

Furthermore, it is presently preferred to employ valves with slidable or rotary valving elements in contrast to valves whose bodies define seats for spherical or otherwise configurated valving elements which are biased by springs and/or otherwise to normally assume their sealing positions. For example, the valving elements 141 of the valves 138 shown in FIGS. 2 to 2b are biased by the springs 142 toward their radially inner end positions in which the openings 140 are exposed to establish large paths for the flow of fluid between the compartments 124 and 125. The slidable valving elements 141 of the valves 138 can be replaced with pivotable valving elements (flaps) which are biased by the springs 142 and/or other suitable biasing means to assume their open positions but can be influenced by centrifugal force and/or by the temperature and/or viscosity of the fluid to move (gradually or otherwise) toward their closed positions.

The configuration of the openings (such as the openings 140 shown in FIGS. 2a and 2b) can also influence the rate at which the flow of fluid can be varied in response to movements of the valving elements between their open and closed positions. Thus, the openings 140 can be configurated or altered to ensure that the rate of fluid flow between the compartments 124, 125 varies gradually or in accordance with a selected pattern during movement of the valving elements 141 from the positions of FIG. 2a to the positions of FIG. 2b and/or vice versa.

If the improved torque transmitting apparatus comprises two or more valves, they are preferably equidistant from each other in the circumferential direction of the piston of the lockup clutch. Furthermore, and as already mentioned above, the features of various embodiments of the improved apparatus can be combined in a number of ways. For example, the apparatus 110 of FIGS. 2 to 2b can employ a valve 138 (or an equivalent valve with a slidable, rotatable or pivotable valving element which can change its position relative to the valve body in response to variations of centrifugal force), and a valve 238 which employs a valving element 241 (or another temperature- and/or viscosity-dependent valving element) capable of changing its position in response to variations of one or more parameters other than centrifugal force. Alternatively, the apparatus 210 of FIGS. 3 and 3a can employ one or more valves 238 and one or more valves 138.

It is also possible to employ valves each of which has two or more valving elements movable in response to variations of one and the same parameter or in response to variations of two or more different parameters.

The valve or valves are preferably installed in the housing of the torque converter. An advantage of such confinement of the valve or valves is that, if the hydraulic system of the torque transmitting apparatus happens to fail for any one of a number of different reasons (for example, when the pumping device P of FIG. 1 fails to supply pressurized fluid to the chamber in the housing (16) of the respective torque converter), the valving element(s) in the chamber of the housing of the torque converter cannot initiate or permit abrupt engagement of the lockup clutch. Such mounting and such mode of operation of the valve or valves prevent accidents when the torque transmitting apparatus is installed in the power train of a motor vehicle. Thus, if the vehicle is at a standstill and the lockup clutch is disengaged, the clutch cannot be engaged in abrupt response to failure of the hydraulic system, i.e., the vehicle cannot be set in motion at a time when this could result in injury to the occupant or occupants, in injury to the passers by and/or in damage to the motor vehicle.

Though it is not necessary that the direction of movement of a valving element from the open position toward the closed position or vice versa remains unchanged, it is often desirable and advantageous to ensure that the valving element or elements move substantially at right angles to the direction of fluid flow through the respective opening or openings during the initial stage of movement of the valving element or elements from their closed positions. Referring to FIGS. 2a and 2b, the valving elements 141 are compelled to move exactly or practically exactly at right angles to the plane of FIGS. 2a and 2b (i.e., at right angles to the direction of fluid flow through the respective openings 140) regardless of whether they are compelled to move toward closed positions under the action of centrifugal force or toward open positions under the bias of the springs 142.

However, it is equally possible to design the valves in such a way that their valving elements must perform composite movements from open toward closed positions and/or vice versa. Nevertheless, it is often desirable to ensure that at least the initial stage of movement of a valving element from its closed position take place at least substantially at right angles to the direction of fluid flow through the respective opening.

It is also within the purview of the invention to select the directions of movement of valving elements relative to the respective valve bodies in such a way that, at least when the valving elements start to move from their respective closed positions, they move at a relatively small or relatively large acute angle (exceeding 0°) relative to the direction of fluid flow through the respective openings. Satisfactory acute angles are those between about 30° and about 90°. Still further, it is possible to alter the direction of movement of one or more valving elements relative to the respective valve body or bodies.

As already mentioned before, the direction of movement of each valving element or at least one of several valving elements can be selected with a view to ensure that the operation of the repsective valve or valves is not affected by the then prevailing pressure of fluid in the torque converter. This can be readily accomplished if the direction of movement of the valving element or elements (such as 141) is at least substantially at right angles to the direction of fluid flow through the respective opening or openings (140), i.e., if the valving elements are compelled to carry out simple sliding movements radially of the axis of the lockup clutch. However, similar results can be obtained if the angle between the direction of sliding movement of a valving element and the direction of fluid flow through the respective opening is less than 90° but more than 0°. Such mounting of the valving elements can also ensure that their movements (i.e., the opening or closing of the respective valves) are not influenced by the pressures prevailing in the neighboring compartments.

It is also within the purview of the invention to incorporate certain features of the improved torque transmitting apparatus into conventional torque transmitting apparatus. Applicants further reserve the right to seek separate patent protection for certain individual constituents or for certain groups of constituents in the aforedescribed and/or equivalent torque transmitting apparatus. For example, the combination of a lockup clutch or bypass clutch with one or more valves corresponding to the valves 138 and/or 238 is believed to constitute a patentable combination which is worthy of protection independently of the exact nature of the hydrokinetic torque converter embodying or containing or cooperating with such combination.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the above outlined contribution to the art and, therefore, such adaptations should and are intended to be comprehended within the meaning and range of equivalence of the appended claims.

What is claimed is:

1. A torque transmitting apparatus comprising a hydrokinetic torque converter having a fluid-containing chamber and including a pump rotatable about a predetermined axis at a variable RPM by a rotary output element of a prime mover, and a turbine disposed in said chamber and including an output member rotatable about said axis; a lockup clutch engageable to transmit torque of variable magnitude from said output element to said output member and disengageable to interrupt the transmission of torque from said output element to said output member, said clutch including a piston rotatable at a plurality of speeds and movable in the direction of said axis and dividing said chamber into first and second compartments respectively containing bodies of a fluid at first and second pressures, the differential between said pressures determining the magnitude of torque being transmitted by said clutch; and at least one valve which is adjustable to establish at least one path for the flow of fluid between said compartments at a rate which varies as a function of variations of the RPM of the piston to thus influence the pressure differential and hence the magnitude of torque being transmitted by said clutch, said at least one valve being operative to permit the flow of fluid between said compartments in response to a reduction of said RPM of said piston to below a predetermined RPM and to at least reduce the rate of fluid flow between said compartments in response to a rise of the RPM of said piston above said predetermined RPM, said at least one valve comprising at least one valving element which is acted upon and is movable by centrifugal force in response to rotation of said piston to thereby reduce the rate of fluid flow between said compartments, said at least one valve further comprising means for yieldably urging said at least one valving element in a direction to increase the rate of fluid flow between said compartments.

2. The apparatus of claim 1, wherein said torque converter further comprises a stator disposed in said chamber between said pump and said turbine as seen in the direction of said axis.

3. The apparatus of claim 1, wherein said at least one valve is a slide valve.

4. The apparatus of claim 1, wherein said at least one valve is rotatable about said predetermined axis.

5. The apparatus of claim 1, wherein said at least one valving element is movable in response to changes of said variations of the RPM of said piston to thereby vary the rate of fluid flow between said compartments independently of at least one of said first and second pressures.

6. The apparatus of claim 5, wherein said at least one valve is a slide valve.

7. The apparatus of claim 1, wherein said piston includes a radially inner portion having a first diameter and surrounding a central opening of the piston and a radially outer portion having a second diameter larger than said first diameter, said at least one valve being nearer to said radially inner portion than to said radially outer portion.

8. The apparatus of claim 1, wherein said lockup clutch further comprises a torsional vibration damper between said piston and said output member, said damper being disposed at a first radial distance and said at least one valve being disposed at a lesser second radial distance from said axis.

9. The apparatus of claim 1, further comprising a torsional vibration damper installed between said output element and said output member, said damper having at least one energy storing element disposed at a first radial distance and said at least one valve being disposed at a lesser second radial distance from said axis.

10. The apparatus of claim 1, wherein said piston has a toothed radially inner annular portion disposed at a first radial distance from said axis, said at least one valve being disposed at a second radial distance from said axis and said second distance at most matching said first distance.

11. The apparatus of claim 1, wherein said piston includes a radially inner portion which is spaced apart from said axis and said at least one valve is adjacent said radially inner portion.

12. The apparatus of claim 1, wherein said at least one valving element is movable between open and closed positions to thereby respectively permit the fluid to flow between said compartments and to at least substantially prevent the fluid from flowing between said compartments, and means for gradually moving said valving element at least from one of said positions to the other of said positions.

13. The apparatus of claim 1, wherein said at least one valve has at least one one opening which establishes said at least one path for the flow of fluid between said compartments, and means for varying the rate of fluid flow through said at least one opening.

14. The apparatus of claim 1, wherein said torque converter further comprises a housing which defines said chamber, said at least one valve being disposed in said housing.

15. The apparatus of claim 1, wherein said at least one valve is connected with said piston.

16. The apparatus of claim 1, wherein said at least one valve is mounted on said piston.

17. The apparatus of claim 1, wherein said at least one valving element is movable between an open position to thus establish a flow of fluid between said compartments in a first direction and a second position in which said at least one valving element at least reduces the rate of fluid flow between said compartments, said at least one valve further comprising means for moving said at least one valving element from said second position in a second direction at least substantially at right angles to said first direction.

18. The apparatus of claim 1, wherein said at least one valving element is movable between an open position to thus establish a flow of fluid between said compartments in a first direction and a second position in which said at least one valving element at least reduces the rate of fluid flow between said compartments, said at least one valve further comprising means for moving said at least one valving element at least from one of said positions to the other of said positions at an angle to said first direction.

19. The apparatus of claim 18, wherein said angle is between about 30° and about 90°.

20. The apparatus of claim 1, wherein said at least one valving element is movable between open and closed positions to thereby influence the rate of fluid flow between said compartments in a first direction, said at least one valving element being movable from at least one of said positions toward the other of said positions in a second direction substantially at right angles to said first direction and at least substantially independently of fluid pressure in at least one of said compartments.

21. The apparatus of claim 20, wherein said at least one valve is a slide valve.

22. The apparatus of claim 1, wherein said at least one valving element is movable between open and closed positions to thereby influence the rate of fluid flow between said compartments in a first direction, said at least one valving element being movable from at least one of said positions toward the other of said positions in a second direction at an angle greater than 0° to said first direction and at least substantially independently of fluid pressure in at least one of said compartments.

* * * * *